United States Patent [19]
Bakker et al.

[11] Patent Number: 6,086,306
[45] Date of Patent: Jul. 11, 2000

[54] BILATERALLY SPLIT RETAINING PIN

[75] Inventors: John H. Bakker, Cortland; William G. Flask, Youngstown, both of Ohio; Vickey E. Reed, Beaver Falls, Pa.; John Kountz, Poland, Ohio

[73] Assignee: General Motors Corporation, Detroit, Mich.

[21] Appl. No.: 09/211,105

[22] Filed: Dec. 15, 1998

[51] Int. Cl.[7] .............................. F16B 13/04; F16B 19/00
[52] U.S. Cl. ........................ 411/508; 411/509; 411/913; 24/297
[58] Field of Search .................................. 411/508, 509, 411/510, 553, 913; 24/297, 324

[56] References Cited

U.S. PATENT DOCUMENTS

| | | | |
|---|---|---|---|
| 3,705,442 | 12/1972 | Sygnator | 24/297 X |
| 4,743,152 | 5/1988 | Nakayama et al. | 411/508 X |
| 4,893,978 | 1/1990 | Frano | 411/553 |
| 5,039,040 | 8/1991 | Idjakiren | 24/297 X |

FOREIGN PATENT DOCUMENTS 821902  10/1959  United Kingdom .................. 24/297

*Primary Examiner*—Neill Wilson
*Attorney, Agent, or Firm*—Cary W. Brooks; Patrick M. Griffin

[57] ABSTRACT

A bilaterally split retainer pin which is structurally robust, having a head easily insertable into an aperture yet highly resistant to backing out through the aperture. The bilaterally split retainer pin includes a post base having a periphery and a pair of legs integrally connected thereto which are mutually separated by a bilateral slot. Each of the legs is composed of a post segment integrally connected with the post base and a head integrally connected with the respective post segment. Each head is characterized by a tapered surface and an abutment surface, wherein a barb radially projects outwardly relative to the periphery a radial length defined by an abutment surface. The tapered surface includes the barb and converges radially toward a respective tip. Each leg has a transverse cut originating at the post base and extending to the tip, wherein the transverse cut slopes from the periphery toward a midsection of the bilaterally split pin. The transverse cut is located at diametrically opposite sides of each of the legs in transverse relation to the slot. Each head is characterized by a flat opposite, and parallel, to the slot, whereby the barb of each respective leg is located diametrically opposite its respective transverse cut. When the bilaterally split retainer pin is pressed through an aperture about the size of the perimeter, the barbs engage the aperture wall and cause the legs to laterally flex parallel to the slot, allowing the heads to pass through the aperture. Upon passage through the aperture, the legs freely flex laterally back to their original configuration, and the abutment surfaces now serve to prevent the head from backing out through the aperture.

10 Claims, 4 Drawing Sheets

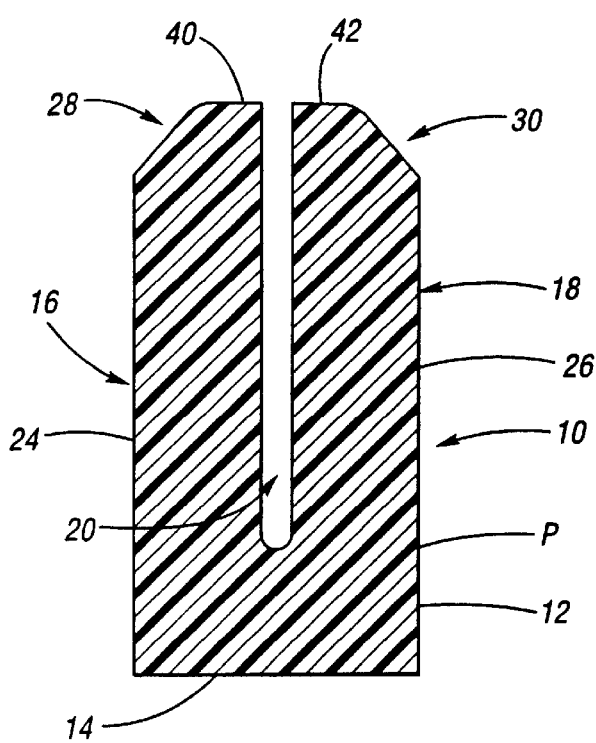
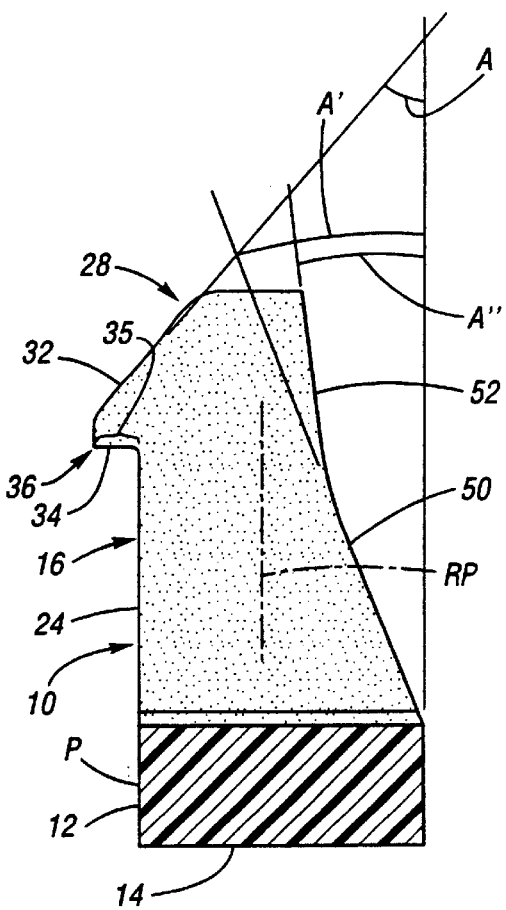
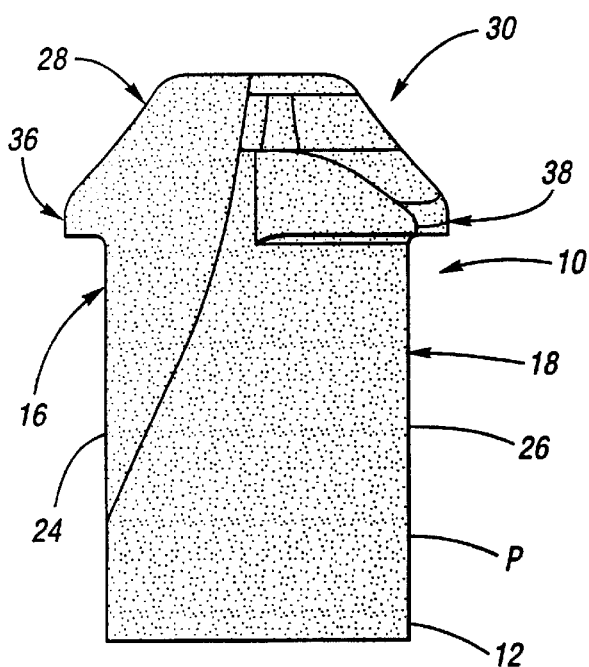
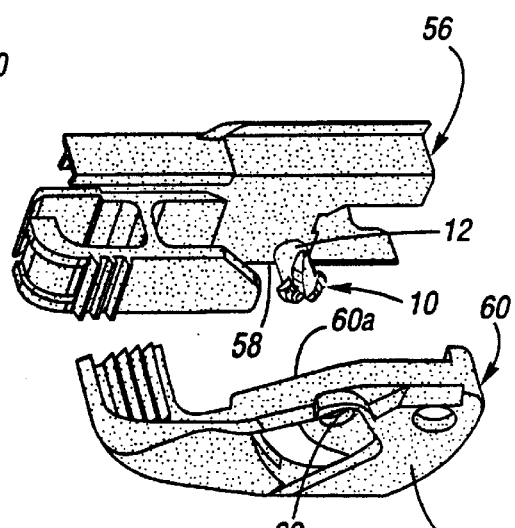
Fig. 3
Fig. 4
Fig. 5
Fig. 6

BILATERALLY SPLIT RETAINING PIN

BACKGROUND OF THE INVENTION

1. Field of the Invention

The present invention relates to retaining pins used for holding one article to another article. More particularly, the present invention relates to a bilaterally split retaining pin, wherein the pin halves are configured for lateral flexing.

2. Description of the Prior Art

Retaining pins are commonly used to snappingly connect one article to another article in response to an applied compressional force therebetween. Typically, a retaining pin has a post and a head connected with the post, wherein a base of the post is connected with a first article opposite the head. The head of the retaining pin is tapered, converging to a top with increasing distance from the base, such as by being rounded or conical. The head has at least one radially projecting barb characterized by the taper and an abutment surface facing toward the base.

In operation of a conventional retaining pin, the tip of the head is aligned over an aperture at an entry side of the second article and is then forced through the aperture by application of a compressional force between the first and second articles. The compressional force acts upon the retaining pin via the inclination angle of the taper to thereby cause the at least one barb to become radially deformed or radially flexed inwardly toward the axis of the retaining pin in order for the barb to pass through the aperture. Upon reaching the exit side of the second article, the at least one barb resiliently resumes its undeformed and/or unflexed shape, whereupon the abutment surface of the at least one barb interferingly engages the exit side of the second article.

While retaining pins are widely used and serve their designed purpose quite well, there remains in the art some disadvantages. For example, a conventional split mushroom head cannot provide ease of insertion into an aperture and high resistance to backing thereout, particularly as regards small diameter retaining pins.

Accordingly, the art has a need for a retaining pin which is robust, having a head easily insertable into an aperture yet highly resistant to backing out through the aperture.

SUMMARY OF THE INVENTION

The present invention is a bilaterally split retainer pin which is structurally robust, having a head easily insertable into an aperture yet highly resistant to backing out through the aperture.

The bilaterally split retainer pin according to the present invention includes a post base having a (circular) periphery and a pair of legs integrally connected thereto, wherein the legs are mutually separated by a bilateral slot. Each of the legs is composed of a post segment integrally connected with the post base and a head integrally connected with the respective post segment. Each head is characterized by a tapered surface and an abutment surface which collectively form a barb radially projecting outwardly relative to the periphery (at the post segment) a radial length defined by the abutment surface. Each tapered surface converges from a respective barb radially toward a respective tip. Each leg has a transverse cut originating at the post base and extending to the tip, wherein the transverse cut slopes from the periphery toward a midsection of the bilaterally split pin. The transverse cut is located at diametrically opposite sides of each of the legs in transverse relation to the slot. Each head is characterized by a flat opposite, and parallel, to the slot, whereby the barb of each respective leg is located diametrically opposite its respective transverse cut.

In a normal environment of operation, the post base is connected with a first article in perpendicular relation to a surface of the first article. A second article to be fastened to the first article by the bilaterally split pin has an aperture of diameter approximately that of the periphery of the post base. When relaxed, the pair of legs have a head cross-section larger than that of the aperture by an amount equal to the sum of the radial length of the two (radially opposed) abutment surfaces. When laterally flexed, the legs have a head cross-section which is about equal to the cross-section of the perimeter.

In operation, the tips are brought alignably over the aperture and the first and second articles are subjected to a mutually compressive force. As the tapered surface on the barbs engages the aperture wall, the inclination angle thereof causes the legs to laterally flex parallel to the slot, which lateral movement is enabled by the transverse cuts. Lateral flexing continues until, in conjunction with a radial flexing into the bilateral slot, the abutment surface of the barbs is retracted to within the cross-section of the periphery, whereupon the barbs are enabled to pass through the aperture. Upon passage through the aperture, the legs freely flex laterally back to their original configuration, and the abutment surfaces now serve to prevent the head from backing out through the aperture (unless the barbs are intentionally retracted).

Accordingly, it is an object of the present invention to provide a retaining pin have a lateral flex feature.

It is an additional object of the present invention to provide a bilaterally split retaining pin having a robust geometry which permits easy entry into an aperture, yet great resistance to backing out therefrom.

These, and additional objects, advantages, features and benefits of the present invention will become apparent from the following specification.

BRIEF DESCRIPTION OF THE DRAWINGS

FIG. 3 is a sectional view of the bilaterally split retaining pin, seen along line 3—3 in FIG. 2.

FIG. 4 is a partly sectional view of the bilaterally split retaining pin, seen along line 4—4 in FIG. 2.

FIG. 5 is a side view of the bilaterally split retaining pin of FIG. 1.

FIG. 6 is a perspective view of the bilaterally split retaining pin, shown in a typical environment of operation.

DETAILED DESCRIPTION OF THE PREFERRED EMBODIMENT

Figure 1:
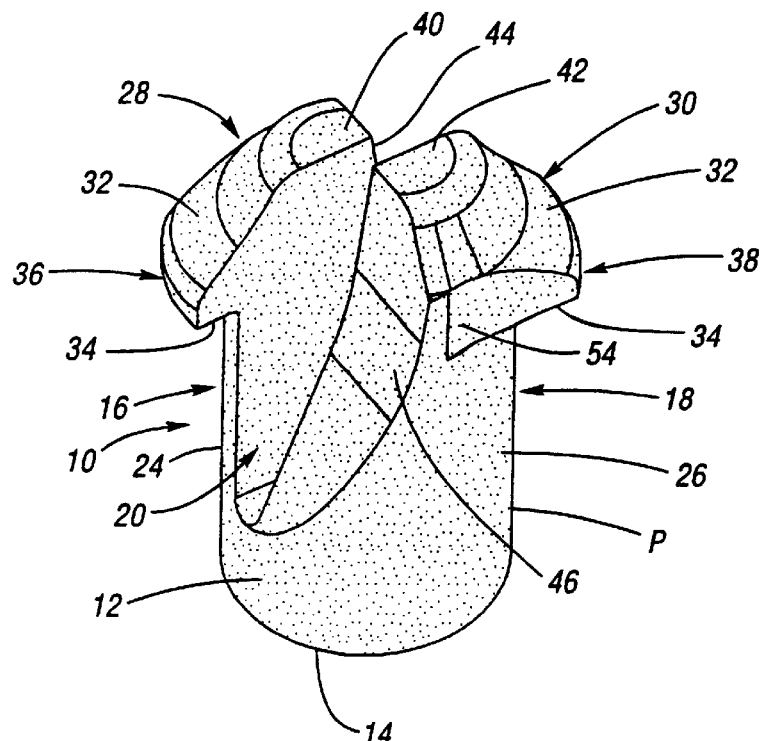
FIG. 1 is a perspective view of the bilaterally split retaining pin according to the present invention.

Referring now to the Drawings, FIGS. 1 through 5 generally depict the bilaterally split retaining pin 10 according to the present invention. The preferred material of composition is plastic, such as for example formed by an injection molding process.

As seen best at FIG. 1, the bilaterally split retainer pin 10 is characterized by a post base 12 having a periphery P, which is preferably circular. The post base 12 is of solid construction, the distal end 14 of which is connected (preferably integrally) in upstanding relation with an article (see for example FIG. 6).

A pair of legs 16, 18 are integrally connected to the post base 12 opposite the distal end 14, wherein the legs are mutually separated by a bilateral slot 20. The bilateral slot 20 bisects the bilaterally split pin along a slot axis 22 (see FIG. 2). The bilateral slot 20 extends only to the post base 12, so that the post base is sufficiently robust to accommodate lateral flexing of the legs 16, 18, as will be discussed hereinbelow.

Each of the legs 16, 18 is composed, respectively, of a post segment 24, 26 integrally connected with the post base 12 and terminating at a respective head 28, 30. Each head 28, 30 is characterized by a tapered surface 32 and an abutment surface 34 which collectively form a respective barb 36, 38. Each abutment surface 34 projects radially outwardly in relation to the periphery P (ie., perpendicularly in relation to the periphery at the post segment) a predetermined radial length 35. In this regard, the tapered surface 32 of each head 28, 30 converges from a respective barb 36, 38 radially toward a respective tip 40, 42.

Figure 2:
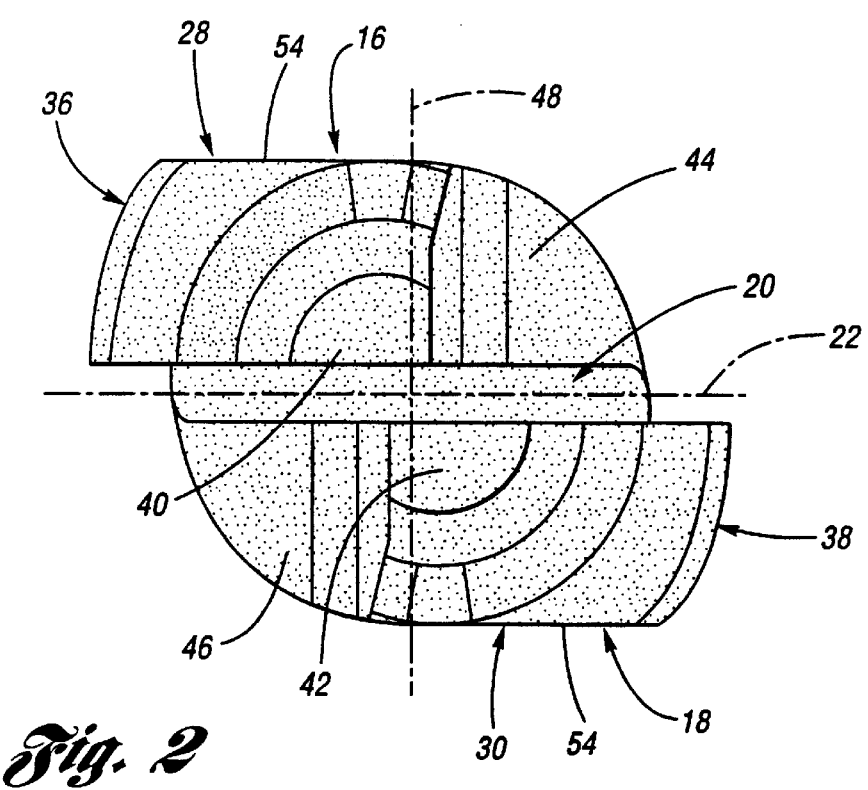
FIG. 2 is a top plan view of the bilaterally split retaining pin of FIG. 1.

Each leg 16, 18 has, respectively, a transverse cut 44, 46 (transverse with respect to the slot axis 22) originating at the post base 12 and extending to the respective tip 40, 42, wherein each transverse cut slopes from the periphery P toward a midsection axis 48 of the bilaterally split pin 10 (see FIG. 2). Preferably, each transverse cut 44, 46 has a first segment 50 and a second segment 52 of lesser inclination angle (slope) than the first segment (see FIG. 4). The transverse cuts 44, 46 are located diametrically opposite each other with respect to the midsection axis 48.

Each head 28, 30 has a flat 54 opposite the bilateral slot 20 and parallel to the slot axis 22. Accordingly, the barb 36, 38 of each respective leg 16, 18 is located diametrically opposite with respect to its transverse cut 44, 46, and, consequently, the barbs are radially opposed to each other.

As mentioned hereinabove, and as shown at FIG. 6, the post base 12 is connected (preferably integrally) with a first article 56 in perpendicular relation to a surface 58 thereof. A second article 60 to be fastened to the first article 56 by the bilaterally split pin 10 has an aperture 62. As shown at FIGS. 7 through 10, the circumference C of the aperture 62 is approximately equal to that of the periphery P of the post base (i.e., circular with a cross-section Ac about equal to, but not less than, the cross-section Pc of the periphery P). Accordingly, since the barbs 36, 38 each have an abutment surface 34 and the barbs are diametrically opposed to each other, when the legs 16, 18 are relaxed the barbs define a first head cross-section Hc that is larger than the cross-section Ac of the aperture 62 by an amount equal to the sum of the radial length 35 of the two abutment surfaces.

FIGS. 7 through 10 depict the bilaterally split retaining pin 10 in operation to fasten the first article 56 to the second article 60.

Figure 7:
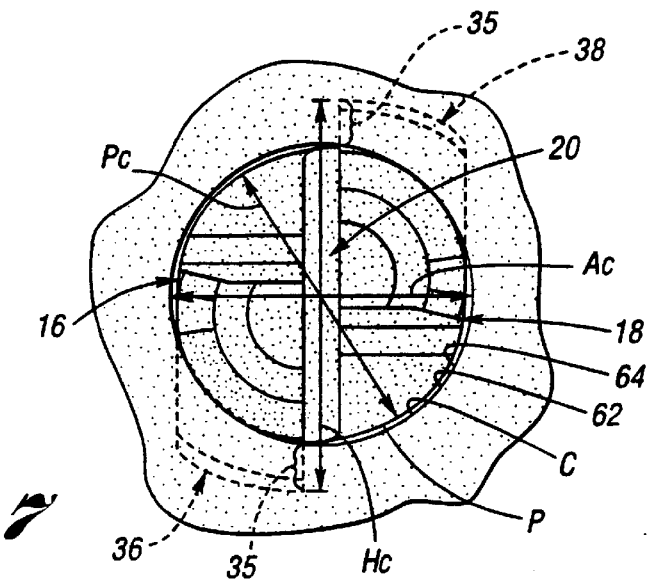
FIGS. 7 through 10 are top plan views of the bilaterally split retaining pin according to the present invention, showing progressive stages of penetration through an aperture.

Initially, the bilaterally split retaining pin 10 is brought up to an entry side 60a of the second article 60 so that the tips 40, 42 engage the aperture 62, wherein the periphery P is aligned with the circumference C of the aperture wall 64, as shown at FIG. 7. Next, the first and second articles are subjected to a mutually compressive applied force.

Figure 8:
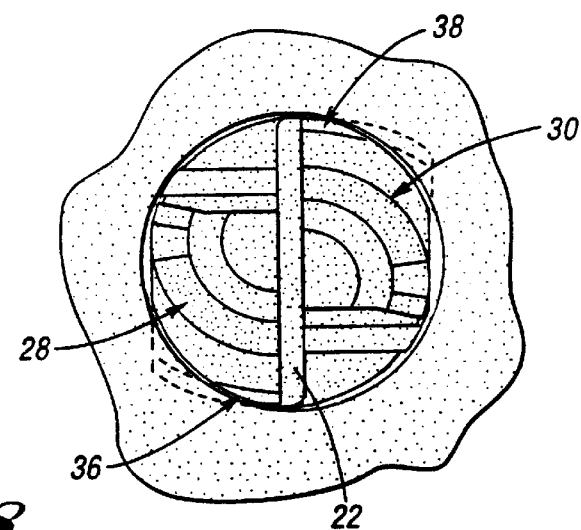

As the inclination angle of the tapered surface on the barbs forcibly engages the aperture wall, the legs are caused to laterally flex parallel to the slot axis (and the bilateral slot). The flexing of each leg, as shown at FIG. 8, is in the direction of the respective transverse cut leading, and the respective barb trailing, the flexing movement, wherein the flexing is made possible because of the absence of material of the legs on account of the transverse cuts.

Figure 9:
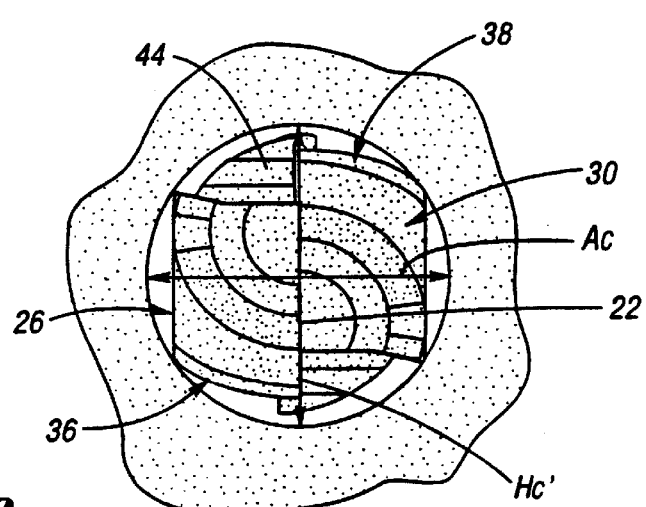

As shown at FIG. 9, the lateral flexing continues until, in conjunction with a radial flexing of the legs into the bilateral slot, a second head cross-section Hc' is achieved, wherein the barbs are retracted to within the cross-section Ac of the aperture 62 (which is about the cross-section Pc of the periphery P), whereupon the barbs are enabled to pass through the aperture. At this stage, the perimeter of the pair of legs is now substantially equal to the perimeter P of the post base.

Figure 10:
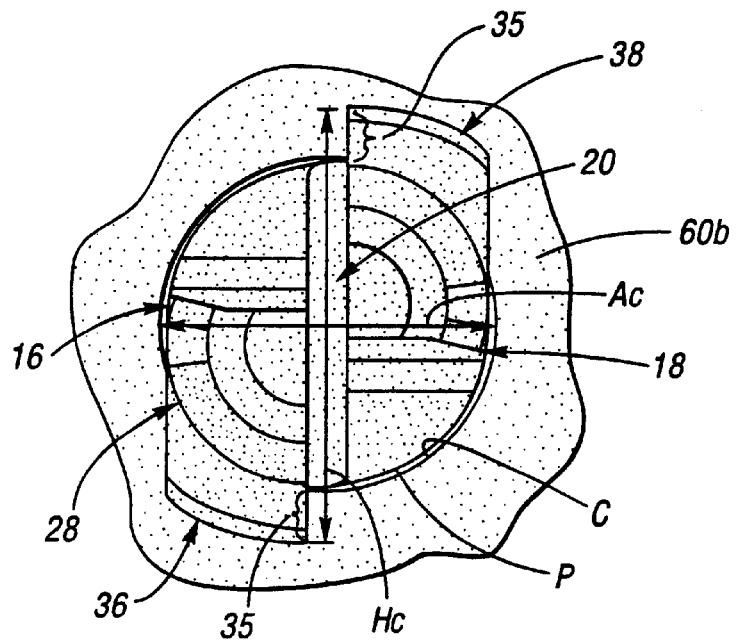

Upon passage through the aperture, as shown at FIG. 10, the legs freely flex laterally back to their original configuration, and the abutment surfaces not interferingly abut an exit side 60b of the second article 60, thereby preventing the head from backing out through the aperture (unless the barbs are intentionally retracted).

Figure 11:
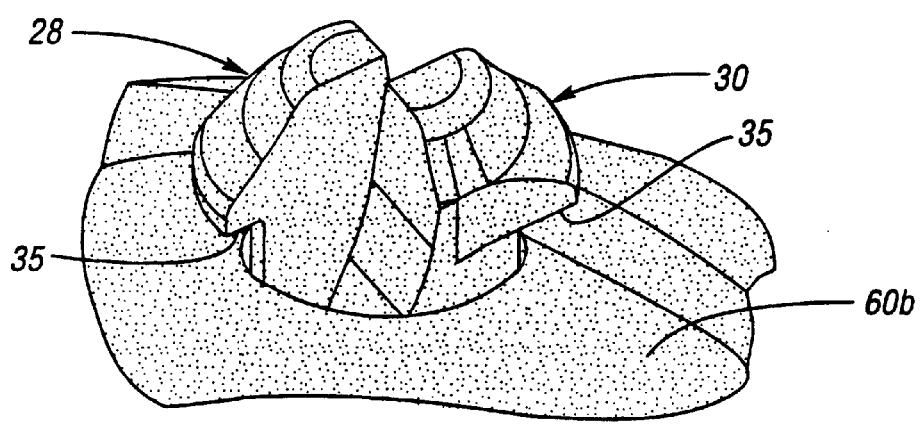
FIG. 11 is a perspective view of the bilaterally split retaining pin fastenably seated in an aperture.

FIG. 11 depicts the bilaterally split retaining pin 10 now fastenably seated with respect to the aperture of the second article (of FIG. 6), so that the barbs now secure the first article to the second article pivotally on the legs and post base.

By way of instructive example only (and not by way of limitation), exemplar dimensional parameters will be given. The bilaterally split retainer pin has a height from the distal end to the tips of about 8 mm., the height of the post base between the distal end and the slot is about 1.68 mm, the height of each of the heads between the abutment surface and the tip thereof is about 2.3 mm. The perimeter P has a cross-section of about 4 mm. The slot has a width of about 0.45 mm. The radial length of each abutment surface is about 0.68 mm. As shown at FIG. 4, the taper at the head has an inclination angle A of about 41 degrees, the first segment of the transverse cut has an inclination angle A' of about 22 degrees, and the second segment of the transverse cut has an inclination angle A" of about 8 degrees, wherein all angles are measured relative to the retainer pin axis RP. For comparison purposes, the aperture of the second article has a cross-section of about 4.25 mm.

To those skilled in the art to which this invention appertains, the above described preferred embodiments may be subject to change or modification. Such change or modification can be carried out without departing from the scope of the invention, which is intended to be limited only by the scope of the appended claims.

What is claimed is:

1. A bilaterally split retaining pin, comprising:

a post base having a periphery; and a pair of legs integrally connected with said post base, each leg of said pair of legs being mutually separated by a bilateral slot defining a slot axis, a midsection axis being perpendicular to said slot axis and passing centrally through said slot, each leg of said pair of legs comprising:

a post segment connected with said post base; and a head connected with said post segment opposite said post base, said head having a tapered surface tapering to a tip and an abutment surface projecting radially from said post segment, said tapered surface and said abutment surface collectively defining a barb, a transverse cut being located on said post segment opposite said barb;

wherein the barb of each leg faces diametrically oppositely relative to each other with respect to the slot axis; wherein each leg is laterally flexible parallel to the slot axis; wherein said pair of legs have a head cross-section variably responsive to the lateral flexing of the legs; and wherein said transverse cut has an inclination angle sloping from the periphery substantially at said post to substantially said midsection axis at said tip.

2. The bilaterally split retaining pin of claim 1, wherein said periphery of said post base defines a periphery cross-section; and wherein the head cross-section is at least variable between a first head cross-section which exceeds said periphery cross-section to a second head cross-section which is substantially equal to said periphery cross-section.

3. The bilaterally split retaining pin of claim 2, wherein each abutment surface radially projects a predetermined radial distance from said post segment, wherein said lateral flexing of the legs between said first and second head cross-sections is substantially a sum of the radial distances.

4. The bilaterally split retaining pin of claim 3, wherein the legs are radially flexible perpendicular to said slot axis.

5. The bilaterally split retaining pin of claim 4, wherein said transverse cut of each leg has a first segment adjoining said post base and a second segment adjoining said tip, wherein said first segment has an inclination angle greater than that of said second segment.

6. The bilaterally split retaining pin of claim 5, wherein at said second head cross-section said pair of legs have a perimeter substantially equal to said perimeter of said post base.

7. A bilaterally split retaining pin, comprising:

a post base having a periphery; and a pair of legs integrally connected with said post base, each leg of said pair of legs being mutually separated by a bilateral slot defining a slot axis, a midsection axis being perpendicular to said slot axis and passing centrally through said slot, each leg of said pair of legs comprising:

a post segment connected with said post base; and a head connected with said post segment opposite said post base, said head having a tapered surface tapering to a tip and an abutment surface projecting radially from said post segment, said tapered surface and said abutment surface collectively defining a barb, a transverse cut being located on said post segment opposite said barb, wherein said transverse cut has an inclination angle sloping from the periphery substantially at said post base to substantially said midsection at said tip;

wherein the barb of each leg faces diametrically oppositely relative to each other with respect to the slot axis; wherein each leg is laterally flexible parallel to the slot axis; and wherein said pair of legs have a head cross-section variably responsive to the lateral flexing of the legs; and wherein said periphery of said post base defines a periphery cross-section; and wherein the head cross-section is at least variable between a first head cross-section which exceeds said periphery cross-section to a second head cross-section which is substantially equal to said periphery cross-section, wherein at said second head cross-section, said pair of legs have a perimeter substantially equal to said perimeter of said post base.

8. The bilaterally split retaining pin of claim 7, wherein each abutment surface radially projects a predetermined radial distance form said post segment, wherein said lateral flexing of the legs between said first and second head cross-sections is substantially a sum of the radial distances.

9. The bilaterally split retaining pin of claim 7, wherein the legs are radially flexible perpendicular to said slot axis.

10. The bilaterally split retaining pin of claim 7, wherein said transverse cut of each leg has a first segment adjoining said post base and a second segment adjoining said tip, wherein said first segment has an inclination angle greater than that of said second segment.

* * * * *